United States Patent [19]

Garfield, Jr.

[11] Patent Number: 5,190,165

[45] Date of Patent: Mar. 2, 1993

[54] METHOD AND APPARATUS FOR FACILITATING THE COLLECTION OF SEPARATED WASTE IN MULTI-STORY BUILDINGS

[76] Inventor: Robert J. Garfield, Jr., 931 Washington St., Hollywood, Fla. 33019

[21] Appl. No.: 788,190

[22] Filed: Nov. 5, 1991

[51] Int. Cl.$^5$ ............................................. B01D 61/00
[52] U.S. Cl. ..................................... 209/655; 209/930
[58] Field of Search ............... 209/655, 702, 930, 942; 193/2 R, 23, 29; 232/43.1, 43.2, 43.5, 44

[56] References Cited

U.S. PATENT DOCUMENTS

| | | | |
|---|---|---|---|
| 1,773,236 | 8/1930 | Moessmer | 193/23 |
| 2,177,328 | 10/1939 | Pender | 193/34 |
| 2,792,171 | 5/1957 | Rosset | 232/43.3 |
| 3,080,033 | 3/1963 | Scott et al. | 193/31 X |
| 3,237,765 | 3/1966 | Gaudin et al. | 209/655 X |
| 3,661,255 | 5/1972 | Toth | 209/655 |
| 3,713,581 | 1/1973 | Mullens | 232/1 E |
| 3,872,784 | 3/1975 | Kaszuba et al. | 100/45 |
| 3,893,615 | 7/1975 | Johnson | 232/43.2 |
| 4,013,551 | 3/1977 | de Feudis | 209/930 X |
| 4,049,105 | 9/1977 | Kindersley | 193/31 |
| 4,070,961 | 1/1978 | O'Rourke et al. | 193/31 R X |
| 4,114,776 | 9/1978 | Pluss | 232/43.1 X |
| 4,640,403 | 2/1987 | McDermott | 193/34 |
| 4,987,988 | 1/1991 | Messina et al. | 193/2 R |
| 5,031,829 | 7/1991 | Shantzis | 232/43.2 |

FOREIGN PATENT DOCUMENTS

| | | | |
|---|---|---|---|
| 3011527 | 10/1981 | Fed. Rep. of Germany | 209/930 |
| 0117879 | 1/1970 | Norway | 209/655 |
| 9008714 | 8/1990 | World Int. Prop. O. | 209/655 |

OTHER PUBLICATIONS

Benton, Craig H. and Fox, Rebecca, "Commingled Recycling Tested In Apartments", *Resource Recycling*, Jun. 1990, pp. 48–50, 87.

Cummings, Mary Leffler, "The State Of The State: Recycling In Florida", *Resource Recycling*, May 1991, pp. 32–39.

O'Toole, Kevin, "How To Build A Materials Recovery Facility That Works", *Resource Recycling*, May 1991, pp. 40–46.

Hyde, Jennifer, "An Experimental Apartment Recycling Program", *Resource Recycling*, Jun. 1990, pp. 30–32.

Watson, Tom, "Municipal Programs Booming In The 10 Biggest Cities", *Resource Recycling*, Dec. 1990, pp. 27–28.

Powell, Jerry, "How Are We Doing? The 1990 Report", *Resource Recycling*, Apr. 1991, pp. 64–69.

*Primary Examiner*—Robert P. Olszewski
*Assistant Examiner*—James R. Bidwell
*Attorney, Agent, or Firm*—Leslie J. Lott & Associates

[57] ABSTRACT

A method and apparatus for facilitating waste collection so as to enable a plurality of users to simultaneously deposit separated waste according to a predetermined schedule in multi-story buildings having at least one substantially vertical trash chute with access doors thereto located on a plurality of the stories, comprising and carrying out the steps of scheduling a type of waste to be collected during a specified interval of time; generating a waste signal representing the type of waste and an interval signal representing the interval of time; positioning a corresponding waste collection container so as to receive the type of waste during the interval of time; and displaying the waste signal and the interval signal.

13 Claims, 3 Drawing Sheets

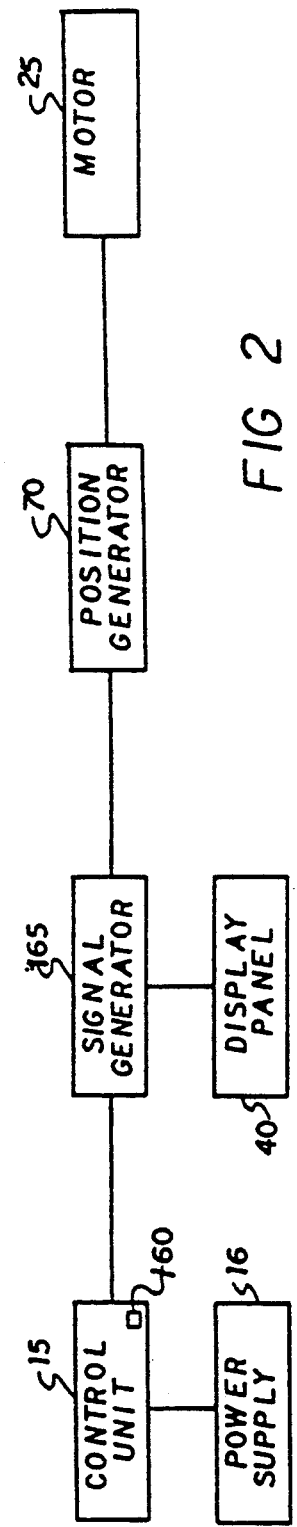
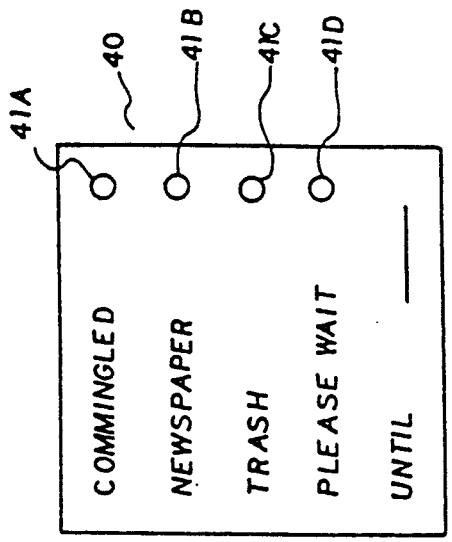
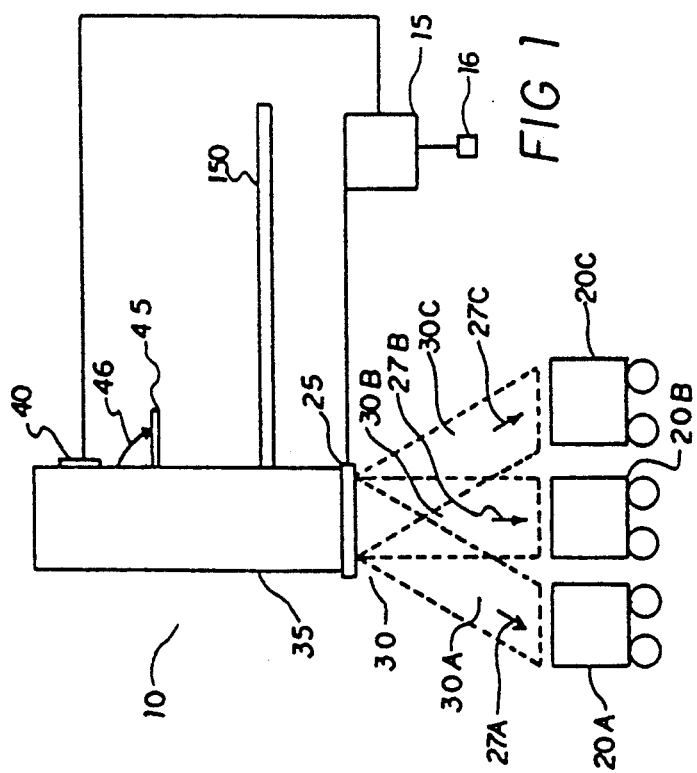

METHOD AND APPARATUS FOR FACILITATING THE COLLECTION OF SEPARATED WASTE IN MULTI-STORY BUILDINGS

TECHNICAL FIELD

This invention relates generally to an improved method and apparatus for facilitating the collection of separated waste in multi-story buildings, and this invention specifically relates to an improved method and apparatus for enabling a plurality of users to unrestrainedly deposit separated waste into specified waste collection bins according to a predetermined schedule.

BACKGROUND OF THE INVENTION

Over the past decade, as people throughout the world have become more and more concerned about the condition of the environment, recycling has become a primary means by which individuals can make their own contribution to saving the planet. As landfills throughout the world are filled beyond their capacity, recycling ordinances have been passed in numerous municipalities, requiring and/or urging citizens to participate in a variety of mandatory and/or voluntary recycling programs.

In the State of Florida, for example, the legislature has set a goal of recycling 30 percent of the total waste stream by 1995. Under a program implemented in Florida, each county is legally responsible for the handling of solid waste issues, including recycling and the disposal of solid waste. Through July 1990, the State of Florida reported a recycling rate of about 15 percent. Among the types of waste which are subject to the recycling effort are aluminum cans, glass bottles, newspapers, and plastic bottles. The state of the state: recycling in Florida, RESOURCE RECYCLING, May 1991 at 32-39. In implementing their individual solid waste management programs, a number of Florida counties have developed their own materials recovery facilities (MRF). In developing its MRF, each county can "personalize" the categories into which waste may be divided. For instance, in Orange County, Florida, the MRF was developed such that one category of recyclable waste included glass bottles and jars, high density polyethylene (HDPE) and polyethylene terephthalate (PET) beverage bottles, and metal cans, including food, beverage, and pet food cans made of steel, aluminum, or bi-metal. This type of a category of waste, which includes a variety of recyclables, is referred to in the industry as "commingled." Newspapers comprised a second category of waste in the Orange County MRF, and nonrecyclable trash comprised a third category. How to build a materials recovery facility that works, RESOURCE RECYCLING, May 1991 at 40-46.

Among those who have begun recycling waste are residents of high-rise buildings, both resiential and commercial, which utilize conventional waste disposal systems including at least one substantially vertical chute, access to which is through doors located on a plurality of floors of such buildings. Traditionally, in the period before recycling, residents of such buildings would dispose of their waste by opening an access door and depositing the waste down the chute. A large waste container, located in a central waste collection room, would be positioned so as to receive the waste that residents deposited down the chute. Examples of such systems are generally illustrated in U.S. Pat. No. 2,177,328, to Pender; U.S. Pat. No. 3,713,581, to Mullens; and U.S. Pat. No. 4,640,403, to McDermott, all of which are incorporated herein by reference.

An attempt to introduce recycling capabilities to multi-story buildings employing waste disposal systems including a conventional chute is generally described in U.S. Pat. No. 5,031,829, to Shantzis. Shantzis generally describes a system which uses a single chute in multi-story buildings to collect into separate large receptacles different categories of wastes already separated by tenants for recycling. To dispose of waste, a tenant carries a container of separated waste to the access door on his floor. While the system described in Shantzis is not in use (i.e., no tenant is disposing of his waste), the access doors on every floor of the building remain locked. To "activate" the system, the tenant pushes a pushbutton to select the type of waste he wishes to dispose. In response to the tenant's pushing of a particular pushbutton, a movable platform, which may be a turntable, rotates to position the appropriate receptacle beneath the chute.

As part of the system described in Shantzis, after the appropriate receptacle is positioned beneath the chute, the access door which the tenant is using is unlocked, and the system generates a sonic indication to inform the tenant that he can dispose of his waste down the chute.

The system described in Shantzis, however, does not address all possible means by which to introduce and/or maintain recycling capabilities in multi-story buildings employing the conventional waste chute systems. For instance, one major disadvantage of the system described in Shantzis is the limitation of the system to one user at a time. This problem is illustrated by the fact that during the time that the tenant is using the waste disposal system described in Shantzis, the access doors on the remaining floors of the multi-story building are locked such that no other tenants can access the system at the same time as the tenant currently using the system.

A second disadvantage of the system described in Shantzis is that each tenant, prior to disposing of his waste, must select, by depressing a particular pushbutton on a control panel, the type of waste to be deposited down the chute. With each resident selecting a type of waste each time he uses the system, and with the system therefore rotating waste containers into position with each new selection, there is a substantial amount of wear-and-tear on the turntable mechanism described in Shantzis. For instance, with potentially hundreds of tenants in a multi-story building making a plurality of selections each week, thousands of repositionings can occur in any given week. Such wear-and-tear results in higher maintenance and labor costs, as service to the unit necessarily occurs more frequently than in a system with infrequent repositionings.

A further disadvantages of the system described in Shantzis results from the door lock system. As stated above, during the time that the tenant is using the waste disposal system described in Shantzis, the access doors on the remaining floors of the mult-story building are locked such that no other tenants can access the system at the same time as the tenant currently using the system. If a situation were to arise where one of the access doors could not be locked, all the remaining doors would remain locked and the entire system, with the exception of the one door "stuck" in the unlocked position, would be inaccessible.

One possible solution to these problems is to provide a system wherein a plurality of users may simultaneously dispose of particular categories of waste according to a predetermined, centrally programmed schedule that minimizes movement, and therefore service and maintenance costs resulting from wear-and-tear thereto, of container-positioning mechanisms. Incorporated into such a system is the ability to configure the categories of waste according to the specifications of a particular community's recycling program.

Thus, there has been a need in the art for a system that facilitates waste collection by enabling a plurality of users, in a multi-story residential or commercial building employing a system that includes at least one trash chute and access doors thereto on a plurality of floors, to simultaneously deposit separated waste according to a predetermined schedule, with one result of such a system being a reduction in the wear-and-tear on the mechanism used for positioning waste collection containers beneath the trash chute.

SUMMARY OF THE INVENTION

The present invention fulfills the need in the art. Broadly described, the present invention provides a method and apparatus for facilitating waste collection in multi-story buildings having at least one substantially vertical trash chute with access doors thereto located on a plurality of said stories.

Generally described, the present invention provides a method and apparatus for facilitating waste collection so as to enable a plurality of users to simultaneously deposit separated waste according to a predetermined schedule in multi-story buildings having at least one substantially vertical trash chute with access doors thereto located on a plurality of said stories, comprising and carrying out the steps of scheduling a type of waste to be collected during a specified interval of time; generating a waste signal representing the type of waste and an interval signal representing the interval of time; positioning a corresponding waste collection container so as to receive the type of waste during the interval of time; and displaying the waste signal and the interval signal.

In a preferred embodiment, the scheduling step comprises and is carried out by selecting a type of waste to be collected and selecting a corresponding interval of time during which the type of waste is to be collected. Optionally, the interval signal may include two signals representing the beginning time of the interval and the ending time of the interval of time.

Responsive to the generation of the waste signal, a bottom section of the trash chute is rotated so as to direct the flow of waste into the corresponding waste container.

In an alternative embodiment of the present invention, positioning of the corresponding waste container is accomplished through the use of a rotatable turntable, a rectilinear platform, or by manual movement.

Accordingly, it is an object of the present invention to provide an apparatus for facilitating waste collection so as to enable a plurality of users to simultaneously deposit separated waste according to a predetermined schedule in multi-story buildings having at least one substantially vertical trash chute with access doors thereto located on a plurality of said stories.

It is another object of the present invention to provide a method for facilitating waste collection so as to enable a plurality of users to simultaneously deposit separated waste according to a predetermined schedule in multi-story buildings having at least one substantially vertical trash chute with access doors thereto located on a plurality of said stories.

It is another object of the present invention to incorporate into an apparatus for facilitating waste collection the ability to meet the specifications of any particular recycling program.

It is another object of the present invention to incorporate into a method for facilitating waste collection the ability to meet the specifications of any particular recycling program.

These and other objects, features, and advantages of the present invention may be more clearly understood and appreciated from a review of the following detailed description of the disclosed embodiment and by reference to the appended drawings and claims.

BRIEF DESCRIPTION OF THE DRAWING FIGURES

FIG. 1 is a perspective view of a waste collection system embodying the present invention.

FIG. 2 is a schematic diagram of a waste collection system embodying the present invention.

FIG. 3 is a display panel.

DETAILED DESCRIPTION OF THE PREFERRED EMBODIMENT

Figure 4:
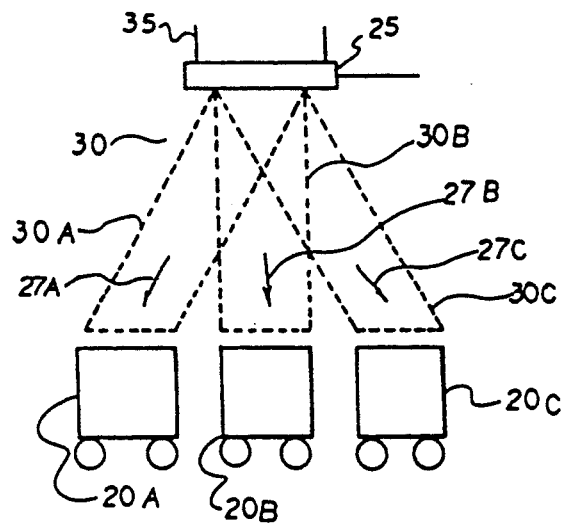
FIG. 4 is an enlarged view of the redirectable bottom section of a trash chute employed in the waste collection system shown in FIG. 1.

Referring now to the drawings, in which like numerals indicate like elements throughout the several views, FIG. 1 is a perspective view of a waste collection system 10 embodying the present invention. Data is entered into a central control unit 15, preferably located in the same general area as the waste collection containers 20A, 20B, 20C. Among the information entered into the central control unit 15 is the type of waste, the beginning time of the interval for collection of the type of waste, and the ending time of the interval for collection of the type of waste. A typical data entry for an entire schedule could be as follows:

| Waste Type | Beginning Time | Ending Time |
| --- | --- | --- |
| Commingled | 8:00 AM | 11:55 AM |
| Newspaper | 12:00 PM | 3:55 PM |
| Trash | 4:00 PM | 7:55 PM |
| Commingled | 8:00 PM | 11:55 PM |
| Newspaper | 12:00 AM | 3:55 AM |
| Trash | 4:00 AM | 7:55 AM |

A clock is also included in the central control unit 15. Once the data is entered into the central control unit 15, the beginning time for the next-to-occur interval is compared to the time on the clock.

When the beginning time for the next-to-occur interval is reached, the central control unit 15, which is connected to a power source 16, generates a signal representing the type of waste to be collected during the interval. The waste signal is transmitted to a motor 25 which controls the bottom section, or trash chute extension, 30 located at the lower end of the trash chute 35. Responsive to the waste signal, the motor 25 moves the trash chute extension 30A, 30B, 30C so as to change the path of the flow of waste (not pictured) in the direction of arrow 27A, 27B, 27C through the trash chute 35 and into the waste collection container 20A, 20B, 20C corresponding to the type of waste. After the trash chute extension 30 is appropriately positioned, the waste signal and the ending time of the interval are displayed on a display panel 40, best illustrated in FIG. 3 and located adjacent to each access door 45, which opens in the direction of arrow 46, on each floor 150 of the building.

Turning now to FIG. 2, which is a schematic diagram of the waste collection system embodying the present invention, an authorized user (not pictured) of the waste disposal system 10 enters the relevant scheduling data into a central control panel 15, such as a commercially available personal computer, familiar to those skilled in the relevant art. The central control panel 15 is connected to a power supply 16. The user enters data representing the beginning time and ending time for each waste category's disposal intervals, such as according to the sample schedule set forth above. Once the scheduling data is entered into the control panel 15, the various beginning times for each interval are compared to the time represented on a clock 160 within the central control panel 15. When a beginning times matches the time on the clock 160, the beginning time, along with its corresponding ending time and waste type, are transmitted to a signal generator 165. The signal generator 165 then transmits a waste signal to a position generator 70, which activates the motor 25. Once activated, the motor 25 operates as illustrated in FIG. 1 above.

Referring now to FIG. 3, which is an illustration of the display panel 40, the waste signal is displayed by illuminating a light 41A, 41B, 41C adjacent to a description of the type of waste whose turn it is to be collected. The ending time interval is displayed next to the word "UNTIL". The information displayed on the display panel 40 serves to provide users of the system 10 the information necessary to properly dispose of their separated waste in the corresponding waste container 20A, 20B, 20C. During the period of time when the system is scheduled for a shift between two categories of waste, the light 41D next to the statement "PLEASE WAIT", or some other equivalent language, is illuminated.

FIG. 4 is an enlarged view of the redirectable bottom section 30 of the trash chute 35. Once the motor 25 receives the waste signal from the central control unit 15, the motor causes the bottom section 30 of the trash chute 35 to move into one of the positions 30A, 30B, 30C that corresponds to the type of waste to be disposed. When the trash (not pictured) is deposited down the trash chute 35, the trash will travel in the direction of the arrow 27A, 27B, 27C corresponding to the position of the bottom section 30 over the waste containers 20A, 20B, 20C, as fully illustrated in FIG. 1.

Figure 5:
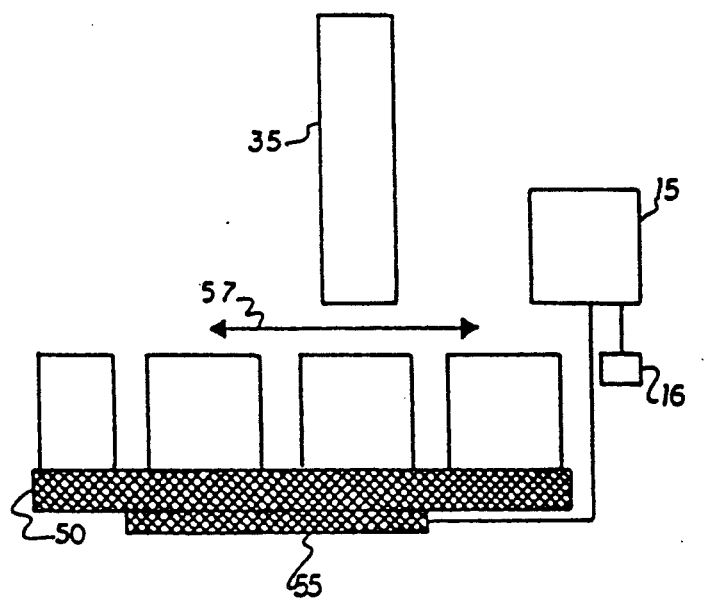
FIG. 5 is a perspective view of a rectalinear platform of an alternative embodiment of the present invention.
Figure 6:
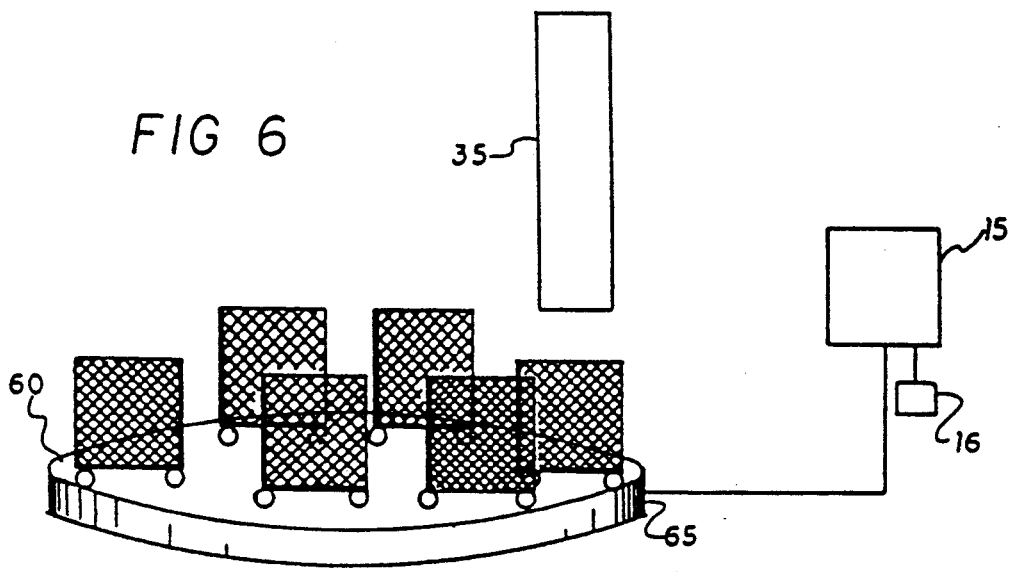
FIG. 6 is a perspective view of a rotating circular platform of an alternative embodiment of the present invention.

Alternative embodiments illustrating the use of a rectalinear platform 50 and a rotating circular platform 60 are shown in FIG. 5 and FIG. 6, respectively. In FIG. 5, the waste signal is transmitted from the central control unit 15 to a motor 55 of the rectalinear platform 50. Responsive to the waste signal, the motor 55 causes the rectalinear platform 50 to move linearly along a line parallel to 57, until the appropriate waste collection container is positioned beneath the trash chute 35. In FIG. 6, the waste signal is transmitted from the central control unit 15 to a motor 65 of the rotating circular platform 60. Responsive to the waste signal, the motor 65 causes the rotating circular platform 60 to rotate, in either a clockwise or counterclockwise direction, until the appropriate waste collection container is positioned beneath the trash chute 35.

Accordingly, it will be understood that the preferred and alternative embodiments of the present invention has been disclosed by way of example and that other modifications and alterations may occur to those skilled in the art without departing from the scope and spirit of the appended claims.

What is claimed is:

1. A method of facilitating waste collection so as to enable a plurality of users to simultaneously deposit separated waste according to a predetermined schedule in multi-story buildings having at least one trash chute with access doors located on a plurality of said stories, comprising the steps of:

scheduling a type of waste to be collected during an interval of time by selecting a type of waste to be collected and selecting a corresponding interval of time during which said type of waste is to be collected, said interval of time comprising a beginning time and an ending time;

generating a waste signal representing said type of waste and an interval signal representing said interval of time;

positioning a corresponding waste collection container so as to receive said type of waste during said interval;

displaying said waste signal; and displaying said ending time.

2. The method of claim 1, wherein said positioning step comprises rotating a bottom section of said trash chute, responsive to said waste signal and said interval signal, so as to change the path of the flow of said type of waste through said trash chute into said corresponding waste collection container during said interval of time.

3. The method of claim 1, wherein said positioning step comprises manually positioning said corresponding waste collection container beneath said trash chute.

4. The method of claim 1, wherein said positioning step comprises rotating a circular platform on which a plurality of waste collection containers is positioned, responsive to said waste signal and said interval signal, so as to position said corresponding waste collection container beneath said trash chute during said interval of time.

5. The method of claim 1, wherein said positioning step comprises moving a rectalinear platform on which a plurality of waste collection containers is positioned, responsive to said waste signal and said interval signal, so as to position said corresponding waste collection container beneath said trash chute during said interval of time.

6. The method of claim 1, wherein said type of waste is selected from the group consisting of commingled waste, newspaper waste, and garbage waste.

7. An apparatus for facilitating waste collection so as to enable a plurality of users to simultaneously deposit separated waste according to a predetermined schedule in multi-story buildings having at least one trash chute with access doors located on a plurality of said stories, comprising:

means for scheduling a type of waste to be collected during an interval of time by selecting a type of waste to be collected and selecting a corresponding interval of time during which said type of waste is to be collected, said interval of time comprising a beginning time and an ending time;

means for generating a waste signal representing said type of waste and an interval signal representing said interval of time;

means for positioning a corresponding waste collection container so as to receive said type of waste during said interval;

means for displaying said waste signal; and means for displaying said ending time.

8. The apparatus of claim 7, wherein said positioning means comprises rotating a bottom section of said trash chute, responsive to said waste signal and said interval signal, so as to change the path of the flow of said type of waste through said trash chute into said corresponding waste collection container during said interval of time.

9. The apparatus of claim 7, wherein said positioning means comprises manually positioning said corresponding waste collection container beneath said trash chute.

10. The apparatus of claim 7, wherein said positioning means comprises rotating a circular platform on which a plurality of waste collection containers is positioned, responsive to said waste signal and said interval signal, so as to position said corresponding waste collection container beneath said trash chute during said interval of time.

11. The apparatus of claim 7, wherein said positioning means comprises moving a rectalinear platform on which a plurality of waste collection containers is positioned, responsive to said waste signal and said interval signal, so as to position said corresponding waste collection container beneath said trash chute during said interval of time.

12. The apparatus of claim 7, wherein said type of waste is selected from the group consisting of commingled waste, newspaper waste, and garbage waste.

13. An apparatus for facilitating waste collection so as to enable a plurality of users to simultaneously deposit separated waste according to a predetermined schedule in multi-story buildings having at least one trash chute with access doors located on a plurality of said stories, comprising:

means for scheduling a type of waste to be collected during an interval of time, comprising selecting a type of waste and a corresponding interval of time during which said type of waste is to be collected, said interval of time comprising a beginning time and an ending time;

means for generating a waste signal representing said type of waste and an interval signal representing said interval of time;

means for positioning a corresponding waste collection container so as to receive said type of waste during said interval, comprising rotating a bottom section of said trash chute, responsive to said waste signal and said interval signal, so as to direct the flow of said type of waste through said trash chute into said corresponding waste collection container during said interval of time; and means for displaying said waste signal and said ending time.

* * * * *